United States Patent [19]
Campos et al.

[11] Patent Number: 5,824,277
[45] Date of Patent: Oct. 20, 1998

[54] PLASMA OXIDATION OF AN EXHAUST GAS STREAM FROM CHLORINATING TITANIUM-CONTAINING MATERIAL

[75] Inventors: Daniel Campos; Stephen Erwin Lyke, both of Wilmington, Del.

[73] Assignee: E. I.du Pont de Nemours and Company, Wilmington, Del.

[21] Appl. No.: 761,734

[22] Filed: Dec. 5, 1996

Related U.S. Application Data

[60] Provisional application No. 60/008,272 Dec. 6, 1995.

[51] Int. Cl.$^6$ ............................. B01D 53/48; C01B 17/50
[52] U.S. Cl. ...................................... 423/242.1; 423/418.2; 423/437 R; 423/532; 423/539; 423/DIG. 10; 204/174
[58] Field of Search ............................. 204/157.3, 157.4, 204/164, 174; 423/242.1, 418.2, 437 R, 532, 539, DIG. 10

[56] References Cited

U.S. PATENT DOCUMENTS

| | | | |
|---|---|---|---|
| 2,446,181 | 8/1948 | Kraus | 183/115 |
| 2,701,179 | 2/1955 | McKinney | 23/87 |
| 3,591,333 | 7/1971 | Carlson et al. | 23/87 |
| 3,783,116 | 1/1974 | Haas et al. | 204/164 |
| 3,883,636 | 5/1975 | Cole et al. | 423/74 |
| 4,277,458 | 7/1981 | Sugier et al. | 423/437 |
| 4,695,358 | 9/1987 | Mizuno et al. | 204/174 |
| 4,954,320 | 9/1990 | Birmingham et al. | 422/186 |
| 5,236,672 | 8/1993 | Nunez et al. | 422/186 |
| 5,254,231 | 10/1993 | Health et al. | 204/164 |
| 5,310,683 | 5/1994 | Godec et al. | 436/123 |
| 5,397,555 | 3/1995 | Steinwandel et al. | 423/215.5 |

OTHER PUBLICATIONS

Gaffney et al. "Gas Chromatographic Detection Reduced Sulfur Compounds Using Ozone Chemilumine Science", no month 1985.

Journal of Chromatography vol. 347, pp. 121–127, Elsevier Science Publishers, Amsterdam the Netherlands.

W.O.Heath, T.M.Bergsman, T.M. Orlando,R.R.Shah,S.E. Barlow,D.L.Lessor,A.J.Peurrung, Development and Analysis of High–Energy Corona Process For Air Purification, U.S.Department of Energy, Jun. 2530,1994L.A.Haas, C.F.Anderson, S.E.Khalafalla, Optimizing Decomposition of Carbonyl Sulfide In An Electrical Discharge, *Bureau of Mines—Report of Investigations 7698,* Abstract–p. 17, 1972 (no month).

R. G. McInnes, Explore New Options For Hazardous Air Pollutant Control, *Chemical Engineering Progress,* pp. 36–48, Nov., 1995.

J. W. Virden, W. O.Heath,S.C.Goheen,M.C.Miller,G.M. Mong,R.L.Richardson, High–Energy Corona For Destruction of Volatile Organic Contaminants In Process Off–Gases, *U.S.Department of Energy,* pp. 670–673, Aug. 23–27, 1992.

*Primary Examiner*—Gary P. Straub
*Assistant Examiner*—Timothy C. Vanoy

[57] ABSTRACT

A process is disclosed for treating an exhaust gas stream containing COS and CO arising from chlorinating titanium-containing material with a cold plasma wherein oxygen is present and selectively oxidizing COS.

8 Claims, No Drawings

PLASMA OXIDATION OF AN EXHAUST GAS STREAM FROM CHLORINATING TITANIUM-CONTAINING MATERIAL

CROSS-REFERENCE TO RELATED APPLICATIONS

This application claims the benefit of U.S. Provisional application Ser. No. 60/008,272 filed Dec. 6, 1995.

BACKGROUND OF THE INVENTION

1. Field of the Invention

This invention relates to a process of contacting an exhaust gas, comprising carbonyl sulfide (COS) which arises from chlorinating titanium-containing material, with a cold plasma and more particularly selectively oxidizing COS to $SO_x$ (x=2 or 3).

2. Description of the Related Art

Use of a plasma formed by a corona discharge for treating toxic organic compounds is known. For example, U.S. Pat. No. 5,254,231 demonstrates reduction of trichloroethylene.

U.S. Pat. No. 3,783,116 discloses decomposition of carbonyl sulfide in a silent (corona) electric discharge to sulfur ($S_x$) and CO. This process is useful to reduce COS from petroleum refineries and in processes involving reactions between sulfur and carbonaceous materials. It is further disclosed that the COS can be oxidized to $CO_2$ after removal of the elemental sulfur. There is no oxygen present during the COS decomposition.

Heretofore, plasma-generating devices have not been used to treat an exhaust gas stream arising from chlorinating titanium-containing material. The process for chlorinating titanium-containing materials in a fluidized bed reactor is known. Suitable processes are disclosed in the following U.S. Pat. Nos.: 2,701,179; 3,883,636; 3,591,333; and 2,446,181 which are hereby incorporated by reference. In such processes, particulate coke, particulate titanium bearing materials, chlorine and optionally oxygen or air, wherein at least one of these contains sulfur, are fed into a reaction chamber. Gaseous titanium tetrachloride, other metal chlorides and non-condensable gases are exhausted from the reaction chamber. The gaseous titanium tetrachloride so produced can then be separated from the other metal chlorides and exhaust gas comprising COS and CO.

In this chlorination process, it is desirable to convert COS to $SO_x$ since removal of COS from the exhaust gas is difficult and costly. For example, one previous method used to remove COS is hydrolysis of COS to $H_2S$ and oxidization to sulfur. However, COS hydrolysis and sulfur production are expensive and involve multiple steps. Another previous method used to remove COS is thermal oxidation, i.e., heating the exhaust gas in an incinerator which requires fuel, costly equipment and additional processing steps. Similarly, catalytic incinerators also require heating, and the COS and other constituents in the exhaust gas could chemically and physically foul the catalyst. There is a need to remove COS from the exhaust gas without incurring substantial cost for downstream abatement with incinerators. Concomitantly, there is a need for a process that promotes COS oxidation where the CO neither diminishes the COS conversion rate nor is significantly converted relative to the COS. A simple and economical process is therefore needed. The present invention meets these needs.

SUMMARY OF THE INVENTION

The present invention provides a process for treating an exhaust gas stream comprising COS, wherein the exhaust gas stream is produced from the chlorination of titanium-bearing material, comprising the steps of:

(a) contacting the exhaust gas with a cold plasma at a temperature within the range of about −20° C. to about 500° C. in the presence of oxygen, and (b) oxidizing COS to $SO_x$, wherein x is 2 or 3.

The exhaust gas stream can further comprise CO. In such an event, the COS is selectively oxidized with minimal oxidation of the CO. When the exhaust gas stream comprises COS and CO, the COS is selectively oxidized to $SO_x$ and $CO_z$, wherein x is 2 or 3, and z is 1 or 2. Preferably, the temperature of the cold plasma is in the range of about 0° C. to about 300° C. and more preferably about 0° to about 150° C. The oxidation of COS to $SO_x$ may occur in the presence or absence of an oxidation catalyst.

The cold plasma may be generated by ionizing radiation selected from the group consisting of alpha-rays, beta-rays, gamma-rays, ultraviolet light, x-rays and high energy electron beam. The cold plasma may also be generated by electrical discharge selected from the group consisting of radio frequency, microwave, laser induced discharge, dc or ac glow discharge, dc or ac corona, arc discharge, silent discharge and streamer corona.

The process of this invention is characterized by the following advantages which cumulatively render this process preferable to processes previously employed:

1. COS is oxidized without significantly heating the exhaust gas;
2. COS emissions are reduced;
3. lower energy requirements and less investment to effect COS removal are achieved;
4. the $SO_x$ formed can be scrubbed from the exhaust gas at low temperatures without removing the heat that would result from substantial CO oxidation; and
5. the process is more tolerant of potential foulants than catalytic incineration.

Surprisingly, it has been found that COS is selectively oxidized in the presence of CO at lower temperatures even in the absence of catalysts. Further, it has been found that COS is converted to $SO_x$ with minimal oxidation of the CO. Oxidizing COS without extensively oxidizing CO minimizes the temperature increase from exothermic oxidation and allows easier removal of $SO_x$ by low temperature, downstream processing steps.

DETAILED DESCRIPTION OF THE INVENTION

In the manufacture of titanium tetrachloride, titanium-bearing material, carbonaceous material, chlorine, and optionally oxygen or air, wherein at least one of these contains sulfur, are fed into a fluidized bed reactor. The titanium-containing material can be any suitable titanium source material such as titanium-containing ores including rutile, ilmenite or anatase ore; beneficiates thereof; titanium-containing byproducts or slags; and mixtures thereof. Suitable carbonaceous material for use in this invention is any carbonaceous material which has been subjected to a coking process or is substantially free of hydrogen.

Gaseous reaction products from the fluidized bed reactor are cooled in stages to first condense and remove metal chlorides other than titanium tetrachloride, such as iron chlorides. The remaining product from the reactor is then cooled to condense titanium tetrachloride leaving a non-condensable exhaust gas stream comprising COS and CO.

In carrying out the invention, the exhaust gas stream is contacted with a plasma in the presence of an oxygen-containing gas at a temperature in the range of about −20° C. to about 500° C., preferably about 0° C. to about 300° C., and more preferably about 0° C. to about 150° C. Typically, the plasma is created by either ionizing radiation or electrical discharge. Alpha-rays, beta-rays, gamma-rays, ultraviolet light, x-rays, high energy electron beams, and the like are used in the ionizing radiation generated plasma. Electrical discharges at low, high and atmospheric gas pressures may be used in the electrical discharge generated plasma. Examples include but are not limited to radio frequency, microwave or laser induced discharges; and dc or ac glow discharges. Electrical discharges at high, low or atmospheric pressures typically include dc or ac coronas, arc discharges, silent discharges and streamer coronas and the like. More specifically, the plasmas are ionized gases made up of free electrons, charged ions, neutral molecules, atoms and radicals as described in greater detail in H. Brachhold, R. Muller and G. Pross, "Plasma Reactions", *Ullmann's Encyclopedia of Industrial Chemistry*, vol. A20, pp. 427–428, (VCH Publishers, Inc., Weinheim, FRG, 1992), the teachings of which are hereby incorporated by reference.

Plasmas are electrically conductive, but, generally, have equal concentrations of positive and negative charge carriers and are electrically quasi-neutral. "Cold", "non-thermal" or "non-equilibrium" plasmas are used herein interchangeably and are distinguished from thermal or equilibrium plasmas in that their free electrons have a much higher temperature than their heavy ions and neutral particles. The plasma is used herein to collectively refer to a discharge formed from a plasma generating device as described above. For example, a corona discharge reactor as described in U.S. Pat. Nos. 4,695,358, 4,954,320, 5,236,672, 5,254,231, a radio frequency plasma reactor (inductively-coupled or capacitively-coupled), a silent electrical discharge from a fluidized bed as described in U.S. Pat. No. 3,734,846, a micro-wave generated plasma reactor as described in "Chemical Engineering Progress", November, 1995, pp. 36–48 and references therein, and the like are contemplated. The entire disclosures of the above teachings are incorporated herein by reference. One established industrial process utilizing cold plasmas is the generation of ozone in a corona discharge.

It will be appreciated by those skilled in the art that the exhaust gas contacts the plasma by passing through a zone where a plasma is generated. Alternatively, the exhaust gas can contact excited species, generated by passing gases such as air, oxygen and the like, through the plasma.

If the exhaust gas does not contain oxygen, an oxygen-containing gas such as air, oxygen or the like, needs to be added. The oxygen concentration, on a molar basis, can be about 1 to 100 times the COS concentration, preferably about 1 to 10 times and most preferably about 2 to 5 times the COS concentration. Optionally, water can be added to an oxygen- containing gas or the exhaust stream.

Pressures of 1 to 200 kilopascals (0.01 to 2 atmospheres), preferably 10–200 kilopascals (0.1 to 2 atmospheres) and more preferably 20–200 kilopascals (0.2 to 2 atmospheres) can be used. An oxidation catalyst may be employed. It has been found in the present invention that the process can be advantageously carried out in the absence of an oxidation catalyst.

The COS is selectively oxidized in the presence of CO at lower temperatures. The COS is converted to $SO_x$ wherein x=2 or 3, which can then be scrubbed at lower temperatures from combustion products, optionally after quenching or heat recovery. The oxidation of COS to $SO_x$ may occur in the presence or absence of any oxidation catalyst. Typical catalysts include, for example, supported chromia, and certain base metal or supported precious metal catalysts. If necessary, CO and COS emissions can be further controlled by thermal incinerators without an additional scrubbing step. Thereafter, the remaining gases can be vented to the atmosphere.

The present invention is further illustrated by the following examples, but these examples should not be construed as limiting the scope of the invention.

EXAMPLES

Example 1

A Sander Ozonizer, model 100, available from Aquarium Stock Company Products, Bayonne, N.J., was tested as a COS oxidation promoter. The Ozonizer, i.e., Ozonator was designed to generate up to 100 mg/hr of $O_3$ from air with a power rating of 4 Watts. It was tested with air and air/He mixtures for $O_3$ capacity using iodide oxidation to detect the ozone. The effect of its corona discharge electrodes on the COS/CO—$O_2$ reactions was tested by passing mixtures of COS/air/He/CO directly through the device at ambient temperatures and analyzing the reaction products by gas chromatography. COS was oxidized to predominately $SO_2$, CO and $CO_2$ with up to 26% conversion and good selectivity relative to CO. $H_2S$, a contaminant, was removed with much higher efficiency. The Ozonizer performed in the range of 80 to 180 kWh/lb of COS converted. CO was also oxidized but to a lesser extent (<2%) and with little interference with COS oxidation.

Results are shown in Table 1 below. Feed rates were 250 milliliters/minute of primarily air (runs A–C) or air-He mixture (runs D–F) including the oxygen and with the additional components as tabulated below, given in micromoles/minute. The ozone production before treatment of the COS containing gas at a setting of 100 mg/hr measured 88 and 96 mg/hr, at a setting of 50 mg/hr measured 60 mg/hr, and at a setting of 100 mg/hr but only 10% air in He, measured 5 mg/hr. Ozone production after treatment of the COS containing gas at a setting of 100 mg/hr (air) measured 88 mg/hr. COS removal persisted or improved at a given Ozonizer setting at lower air concentrations where it is unlikely much ozone formed.

TABLE 1

| Run | $O_2$ | COS | $O_3$ | $H_2S$ | CO | COS conv. | kWh/ lb-COS | $H_2S$ conv. |
|---|---|---|---|---|---|---|---|---|
| A | 2200 | 35 | 35 | 1 | 0 | 12% | 120 | >95% |
| B | 2200 | 35 | 18 | 1 | 0 | 6% | 120 | >90% |
| C | 2200 | 12 | 35 | 0.3 | 0 | 16% | 260 | >90% |
| D | 70 | 35 | 35* | 1 | 0 | 13% | 110 | ~55% |
| E | 70 | 12 | 35* | ND** | 0 | 26% | 161 | |
| F | 70 | 12 | 35* | ND** | 313 | 23% | 183 | |

*Based on Ozonizer setting.
**ND means not detected.

Example 2

An experimental ozone generator based on a radio frequency plasma was employed. The device was designed to generate ozone more efficiently than commercially available corona discharge units. A series of screening tests similar to those outlined above with this larger capacity (70 Watt) unit were run. Results were observed with COS conversions of about 50% at 170 kWh/lb COS converted and 40% at 90 kWh/lb COS converted and with less than 5% CO converted.

Having thus described and exemplified the invention with a certain degree of particularity, it should be appreciated that the following claims are not to be limited but are to be afforded a scope commensurate with the wording of each element of the claims and equivalents thereof.

What is claimed is:

1. A process for treating an exhaust gas stream comprising COS, wherein the exhaust gas stream is produced from the chlorination of titanium-containing material, comprising the steps of:

(a) passing the exhaust gas stream into a cold plasma generating zone generating a cold plasma at a temperature within the range of about −20° C. to about 500° C. in the presence of oxygen, and (b) oxidizing COS to $SO_x$, wherein x is 2 or 3.

2. The process of claim 1, wherein the exhaust gas stream comprises COS and CO, and COS is selectively oxidized to $SO_x$ and $CO_z$, wherein x is 2 or 3 and z is 1 or 2.

3. The process of claim 1 or claim 2, wherein the temperature of the cold plasma is within the range of about 0° C. to about 300° C.

4. The process of claim 3, wherein the temperature of the cold plasma is within the range of about 0° C. to about 150° C.

5. The process of claim 1, claim 2 or claim 4, wherein the plasma is generated by ionizing radiation selected from the group consisting of alpha-rays, beta-rays, gamma-rays, ultraviolet light, x-rays and high energy electron beam.

6. The process of claim 1, claim 2 or claim 4, wherein the plasma is generated by electrical discharge selected from the group consisting of radio frequency, microwave, laser induced discharge, dc or ac glow discharge, dc or ac corona, arc discharge, silent discharge and streamer corona.

7. The process of claim 1 or claim 2, wherein step (b) occurs in the absence of an oxidation catalyst.

8. The process of claim 1 or claim 2, wherein step (b) occurs in the presence of an oxidation catalyst.

* * * * *